United States Patent

[11] 3,592,116

| [72] | Inventor | Arno Ritze<br>Stuttgart-Mohringen, Germany |
|---|---|---|
| [21] | Appl. No. | 856,580 |
| [22] | Filed | Sept. 10, 1969 |
| [45] | Patented | July 13, 1971 |
| [73] | Assignee | Zeiss Ikon Aktiengesellschaft<br>Stuttgart, Germany |
| [32] | Priority | Sept. 28, 1968 |
| [33] | | Germany |
| [31] | | P 17 97 443.5 |

[54] AUTOMATIC DIAPHRAGM ADJUSTMENT FOR A PHOTOGRAPHIC CAMERA
4 Claims, 1 Drawing Fig.

[52] U.S. Cl. ............................................. 95/64 R,
 95/10 C, 352/141
[51] Int. Cl. ............................................... G03b 19/18
[50] Field of Search ................................... 352/141;
 95/10 C, 64

[56] References Cited
UNITED STATES PATENTS

| 3,421,812 | 1/1969 | Kubota | 95/10 (C) X |
| 3,430,053 | 2/1969 | Westhauer | 352/141 UX |
| 3,452,656 | 7/1969 | Ruhle et al. | 95/10 (C) |
| 3,461,786 | 8/1969 | Sato et al. | 352/141 |

FOREIGN PATENTS

| 375,222 | 3/1964 | Switzerland | 352/141 |

Primary Examiner—Samuel S. Matthews
Assistant Examiner—Joseph F. Peters, Jr.
Attorney—Singer, Stern & Carlberg ABSTRACT: An automatic diaphragm adjustment device for a photographic camera in which a photoconductive cell is arranged in the input circuit of a Wheatstone bridge and is illuminated by light coming from the subject being photographed and passing through an adjustable diaphragm arranged in front of the photoconductive cell. The diaphragm is operatively connected with the adjustable diaphragm of the camera objective and with an electric motor. A transistor amplifier having at least two transistors is arranged in the diagonal of the Wheatstone bridge and controls the electric motor rotating it in one or the other direction as the case may be until the bridge is balanced. One of the transistors is bridged by a conductor including a manually operable switch, so that when the switch is closed the diaphragm is closed by the electric motor.

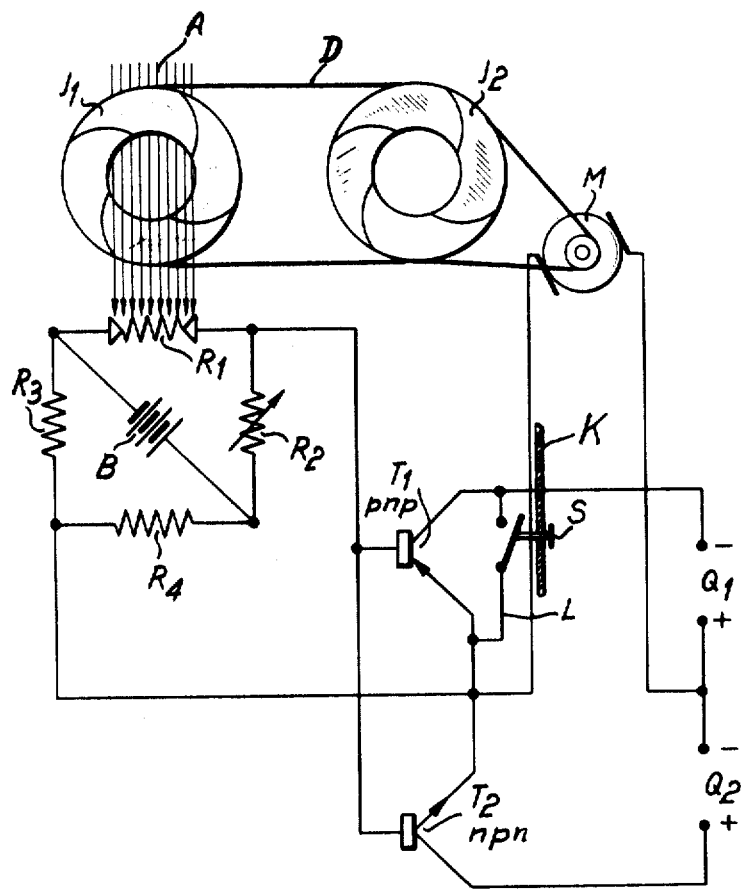

AUTOMATIC DIAPHRAGM ADJUSTMENT FOR A PHOTOGRAPHIC CAMERA

The invention relates to an automatic diaphragm adjustment device for a photographic camera which is equipped with a bridged circuit in the diagonal circuit of which are arranged at least two complementary transistors of the types PNP and NPN and two voltage supply sources which are arranged in series and comprise a transistor amplifier which adjusts a diaphragm adjusting motor.

This type of device on a photographic camera has the purpose of automatically adjusting the aperture of the objective diaphragm in relation to the illumination condition of a photoconductive cell. It has already been proposed heretofore to arrange in front of a photoconductive cell a so-called oscillating diaphragm which in motion-picture cameras opens and closes during the change from one scene to another, whereby the photoconductive cell which controls the aperture of the camera objective is bridged by a disconnectable conductor.

If one applies this last-named feature to adjusting devices of the above-mentioned type, the bridge circuit retains also its control function for the independent illumination of the photographed subject desired for the closing and opening of the diaphragm and this results in an undesired load on the voltage supply circuit for the motor which adjusts the diaphragm.

It is an object of the present invention to overcome this disadvantage in a very simple manner.

The present invention provides a disconnectable bridging conductor which is arranged parallel to the transistor arrangement which operates the diaphragm adjusting motor which is used for closing the diaphragm of the camera objective. This bridging conductor may be so arranged that it connects the emitter and collector of the transistor or also the collector and the base of the transistor. A switching key may be used for closing the bridging conductor. This switching key is arranged on the camera housing and which when released by the operator of the camera returns automatically into a position in which said bridging conductor is open or interrupted. This switching key may also be arranged in the handle of the camera.

In addition thereto, the adjusting mechanism may be provided with means for indicating the limits of the adjusting range of the objective diaphragm which will indicate the end of the diaphragm adjusting procedure.

The single FIG. of the drawing illustrates one particular example of the automatic diaphragm adjustment device of the invention.

The input circuit which is arranged in the form of a Wheatstone bridge contains a photoconductive cell $R_1$ and three additional resistances $R_2$, $R_3$, and $R_4$, of which the resistance $R_2$ may consist of an adjustable resistance for introducing into the exposure value different exposure factors. The bridge is supplied with current by a battery B arranged in one of the diagonals of the bridge circuit. In the other diagonal of this bridge is arranged a transistor amplifier consisting of a transistor $T_1$ of the type PNP, a transistor $T_2$ of the type NPN and two serially arranged voltage supply sources $Q_1$ and $Q_2$. The base of the two transistors $T_1$ and $T_2$ and the emitter of both transistors $T_1$ and $T_{20}$ are arranged in the mentioned diagonal circuit of the Wheatstone bridge. The positive terminal of $Q_1$ and the minus terminal of $Q_2$ are connected by a common conductor to one terminal of the adjusting motor M, while the other terminal of this adjusting motor M is connected with the emitters of the two transistors $T_1$ and $T_2$. The minus terminal of the voltage supply source $Q_1$ is connected with the collector of the transistor $T_1$, and the positive terminal of the voltage supply source $Q_2$ is connected with a collector of a transistor $T_2$. In front of the photoconductive cell $R_1$ is arranged a diaphragm $J_1$ which controls the illumination which reaches the photoconductive cell $R_1$. The adjustable diaphragm $J_1$ is operatively connected by a drive mechanism D with the diaphragm $J_2$ of the camera objective of the photographic camera and with the adjusting motor M. The emitter and the collector of the transistor $T_2$ are connected with each other by a bridging conductor L which can be opened and closed by a switch which is manually operated by a switching key S mounted on the camera casing K.

When the photoconductive cell $R_1$ is energized by the light beam A passing through the diaphragm $J_1$, the Wheatstone bridge may become unbalanced so that a negative voltage is supplied to the base of the two transistors $T_1$ and $T_2$, while a positive voltage is supplied to the emitters of the two transistors $T_1$ and $T_2$ and this causes an electric current to flow in the circuit $+Q_1-M-T_1--Q_1$, so that the motor M is operated. The circuit $-Q_2-M-T_2-+Q_2$, however, is blocked as the result of the complementary behavior of the transistor $T_2$ with respect to the transistor $T_1$. If the balance of the Wheatstone bridge is disturbed in the opposite sense, namely, when a positive voltage is supplied to the base of the two transistors $T_1$ and $T_2$, while a negative voltage is supplied to the two emitters, then the flow of the electric current will be in the opposite direction. A collector current flows in the circuit $-Q_2-M-T_2-+Q_2$ and the circuit $+Q_1-M-T_1--Q_1$ is blocked. The result is that the adjusting motor M rotates in one or the other direction until the balance of the bridge is again established.

If the diaphragm of the camera is to be adjusted independent of the illumination condition of the subject being photographed, then the switching key S has to be manually depressed by the operator so that the switch in the bridging conductor L is closed. In this manner, the motor is actuated thereby closing both of the diaphragms $J_1$ and $J_2$ until they reach the limit of their adjustability. In order to indicate this condition there are provided well-known means, the description of which does not appear to be necessary at this time. If, however, one desires that the diaphragm apertures be again adjusted in accordance with the prevailing illumination conditions, then it is merely necessary to release the depressed switching key L. Obviously, this automatic diaphragm adjustment is also suitable for cameras in which the photoconductive cell $R_1$ is illuminated by a portion of the light which passes through the diaphragm of the camera objective.

What I claim is:

1. Automatic diaphragm adjustment device for a photographic camera, comprising a photoconductive cell, an adjustable diaphragm in front of the same for controlling the illumination energizing said cell, an adjustable camera objective diaphragm, an electric motor operatively connected with said two diaphragms, means forming a bridge circuit having an input circuit in which said photoconductive cell is arranged, at least two complementary transistors of the types PNP and NPN and two serially arranged voltage supply sources forming a transistor amplifier which is arranged in one of the diagonals of said bridge circuit for controlling the operation of said motor, and a disconnectable conductor arranged across the emitter-collector path of to one of said transistors for causing a closing of said diaphragm when said conductor is closed so as to bridge said transistor.

2. A device according to claim 1, in which said disconnectable conductor is connected with the emitter and the collector of said one transistor.

3. A device according to claim 1, including a switch in said disconnectable conductor and a manually operable switch key on the camera casing for controlling the operation of said switch.

4. A device according to claim 1, including a switch in said disconnectable conductor and a manually operable switch key on the camera casing for controlling the operation of said switch, said manually operable switch key being so constructed that upon release of the same it causes said switch to open.